United States Patent
Wu et al.

(10) Patent No.: US 12,429,914 B2
(45) Date of Patent: Sep. 30, 2025

(54) FLEXIBLE DISPLAY DEVICE AND ELECTRONIC DEVICE

(71) Applicants: Mianyang BOE Optoelectronics Technology Co., Ltd., Sichuan (CN); BOE Technology Group Co., Ltd., Beijing (CN)

(72) Inventors: Yongkai Wu, Beijing (CN); Jenyu Lee, Beijing (CN); Haoyuan Fan, Beijing (CN); Xuwei Li, Beijing (CN); Feng Yang, Beijing (CN); Zongqiu Hang, Beijing (CN); Ming Dai, Beijing (CN); Yan Zhao, Beijing (CN); Tianlong Zhao, Beijing (CN); Yaohong Tan, Beijing (CN); Xiaodong Cong, Beijing (CN); Qicheng Chen, Beijing (CN); Xiaoge Wang, Beijing (CN)

(73) Assignees: MIANYANG BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 747 days.

(21) Appl. No.: 17/789,291

(22) PCT Filed: Jun. 17, 2021

(86) PCT No.: PCT/CN2021/100726
§ 371 (c)(1),
(2) Date: Jun. 27, 2022

(87) PCT Pub. No.: WO2022/012259
PCT Pub. Date: Jan. 20, 2022

(65) Prior Publication Data
US 2023/0049009 A1  Feb. 16, 2023

(30) Foreign Application Priority Data
Jul. 17, 2020 (CN) .......................... 202010690264.X

(51) Int. Cl.
*G06F 1/16* (2006.01)
*G02B 5/30* (2006.01)

(52) U.S. Cl.
CPC .......... *G06F 1/1652* (2013.01); *G02B 5/3025* (2013.01)

(58) Field of Classification Search
None
See application file for complete search history.

(56) References Cited

U.S. PATENT DOCUMENTS

| 7,907,246 B2 | 3/2011 | Onishi et al. |
| 8,009,255 B2 | 8/2011 | Onishi et al. |

(Continued)

FOREIGN PATENT DOCUMENTS

| CN | 101297233 A | 10/2008 |
| CN | 102683384 A | 9/2012 |

(Continued)

OTHER PUBLICATIONS

International Search Report and Written Opinion mailed on Sep. 23, 2021, in corresponding PCT/CN2021/100726, 10 pages.

(Continued)

*Primary Examiner* — Phu Vu
(74) *Attorney, Agent, or Firm* — XSENSUS LLP

(57) ABSTRACT

A flexible display device and an electronic device are provided. The flexible display device includes a display substrate, a polarizer and a first optical adhesive layer that are sequentially stacked, and is provided with a display area and a first corner area. In the first corner area, an outer contour of the polarizer and/or an outer contour of the first optical adhesive layer extend(s) beyond an outer contour of (Continued)

the display substrate. The display substrate includes an anti-crack base, an anti-crack retaining wall, and a plurality of anti-crack blocks that are at least located in the first corner area. The anti-crack retaining wall is formed on the anti-crack base and located outside of the display area, and the plurality of anti-crack blocks are formed on the anti-crack base and located on the side of the anti-crack retaining wall away from the display area.

20 Claims, 7 Drawing Sheets

(56) References Cited

U.S. PATENT DOCUMENTS

| | | | |
|---|---|---|---|
| 8,072,568 | B2 | 12/2011 | Onishi et al. |
| 8,189,156 | B2 | 5/2012 | Onishi et al. |
| 8,698,987 | B2 | 4/2014 | Onishi et al. |
| 2009/0046235 | A1 | 2/2009 | Onishi et al. |
| 2009/0096965 | A1 | 4/2009 | Nagata |
| 2010/0188631 | A1 | 7/2010 | Onishi et al. |
| 2011/0037936 | A1 | 2/2011 | Onishi et al. |
| 2011/0043744 | A1 | 2/2011 | Onishi et al. |
| 2012/0200220 | A1 | 8/2012 | Onishi et al. |
| 2015/0162392 | A1 | 6/2015 | Lim et al. |
| 2016/0111677 | A1 | 4/2016 | Hong et al. |
| 2017/0155080 | A1 | 6/2017 | Jo et al. |
| 2017/0373270 | A1 | 12/2017 | Kim et al. |
| 2018/0322826 | A1 | 11/2018 | Lee et al. |
| 2019/0057645 | A1 | 2/2019 | Kwon et al. |
| 2019/0121195 | A1 | 4/2019 | Kitabayashi |
| 2019/0140036 | A1 | 5/2019 | Hyeon et al. |
| 2020/0285095 | A1 | 9/2020 | Okumura et al. |
| 2021/0302777 | A1* | 9/2021 | Fujikawa .......... G02F 1/133562 |
| 2021/0343970 | A1* | 11/2021 | Luo .................... H10K 50/8426 |
| 2022/0077242 | A1* | 3/2022 | Yoon .................... H10K 59/873 |

FOREIGN PATENT DOCUMENTS

| | | |
|---|---|---|
| CN | 103022369 A | 4/2013 |
| CN | 103824526 A | 5/2014 |
| CN | 104464524 A | 3/2015 |
| CN | 107004698 A | 8/2017 |
| CN | 107863376 A | 3/2018 |
| CN | 107994050 A | 5/2018 |
| CN | 108449448 A | 8/2018 |
| CN | 108511504 A | 9/2018 |
| CN | 108766242 A | 11/2018 |
| CN | 109037477 A | 12/2018 |
| CN | 109616017 A | 4/2019 |
| CN | 109616588 A | 4/2019 |
| CN | 109767723 A | 5/2019 |
| CN | 208904069 U | 5/2019 |
| CN | 108449448 B | 6/2019 |
| CN | 109872629 A | 6/2019 |
| CN | 109979333 A | 7/2019 |
| CN | 110350013 A | 10/2019 |
| CN | 111369896 A | 7/2020 |
| CN | 111373467 A | 7/2020 |
| CN | 111798759 A | 10/2020 |
| JP | 2002-258294 A | 9/2002 |
| JP | 2012-041196 A | 3/2012 |
| KR | 2017-0058474 A | 5/2017 |
| KR | 2017-0071662 A | 6/2017 |
| WO | 2007/032395 A1 | 3/2007 |
| WO | 2019/048452 A1 | 3/2019 |
| WO | 2019/174112 A1 | 9/2019 |
| WO | 2020/233339 A1 | 11/2020 |
| WO | 2021/008411 A1 | 1/2021 |

OTHER PUBLICATIONS

Notice of Allowance issued on Sep. 28, 2021, in corresponding Chinese patent Application No. 202010690264.X, 11 pages.

* cited by examiner

FLEXIBLE DISPLAY DEVICE AND ELECTRONIC DEVICE

CROSS-REFERENCE TO RELATED APPLICATIONS

The present disclosure is a national phase entry under 35 U.S.C. § 371 of International Application No. PCT/CN2021/100726, filed on Jun. 17, 2021 and claims priority of Chinese Patent Application No. 202010690264.X, filed on Jul. 17, 2020, and entitled "FLEXIBLE DISPLAY APPARATUS AND ELECTRONIC DEVICE," the entire disclosures of which are incorporated herein by reference in their entireties.

TECHNICAL FIELD

The present disclosure relates to the field of display technology, and in particular, to a flexible display device and an electronic device.

BACKGROUND

At present, from a perspective of market trends, flexible display products have become favored objects of electronic devices such as mobile phones and tablet computers. Flexible display products may be designed to match different shape models according to the electronic devices to provide different curved display requirements.

However, the flexible display product has a stress problem after bending, particularly the stress problem at corner positions is more serious, easy to produce cracks and other undesirable phenomena, which may easily lead to product encapsulating failure, and black spots and other undesirable phenomena in a display area. Product quality is influenced, and product reliability is low, meanwhile, the product is most likely to be pressed by external force at the corner position during use, resulting in a high risk of adverse effects.

It should be noted that the information disclosed in the background section above is only used to enhance the understanding of the background of the present disclosure, and therefore may include information that does not constitute the prior art known to those of ordinary skill in the art.

SUMMARY

The present disclosure provides a flexible display device and an electronic device.

In a first aspect of the present disclosure, there is a flexible display device provided, which includes a display substrate, a polarizer and a first optical adhesive layer stacked in sequence, provided with a display area and a peripheral area around the display area, the peripheral area including a first lateral area extending in a first direction, a second lateral area extending in a second direction, and an arc-shaped corner area between the first lateral area and the second lateral area.

The arc-shaped corner area has a first side, an inner arc side, a second side and an outer arc side connected end to end sequentially, the first side is connected with the first lateral area, and the second side is connected with the second lateral area. The arc-shaped corner area includes a first corner area having the first side and a second corner area having the second side, a center of the arc-shaped corner area being in the first corner area. The arc-shaped corner area is bendable, and a bending angle of the first corner area is larger than a bending angle of the second corner area. In the first corner area, an outer contour of an orthographic projection of the polarizer and/or the first optical adhesive layer on a reference plane is outside of an outer contour of an orthographic projection of the display substrate on the reference plane.

The display substrate includes an anti-crack base, an anti-crack retaining wall and a plurality of anti-crack blocks that are at least in the first corner area, the anti-crack retaining wall is on the anti-crack base and outside of the display area, and the plurality of anti-crack blocks are on the anti-crack base and on one side of the anti-crack retaining wall away from the display area.

The first direction intersects the second direction. The reference plane is a plane parallel to the first direction and the second direction.

In a second aspect of the present disclosure, there is also an electronic device provided, which includes the flexible display device according to the first aspect.

It should be understood that both the foregoing general description and the following detailed description are exemplary and explanatory only and not for limiting the present disclosure.

BRIEF DESCRIPTION OF THE DRAWINGS

Accompanying drawings herein, which are incorporated in the specification and constitute a part of the present specification, illustrate embodiments conforming to the present disclosure, and are used to explain the principles of the present disclosure together with the specification. It is apparent that the accompanying drawings described below are only some embodiments of the present disclosure, and other accompanying drawings can also be obtained according to these accompanying drawings without any creative efforts by those skilled in the art.

DETAILED DESCRIPTION

Figure 1:
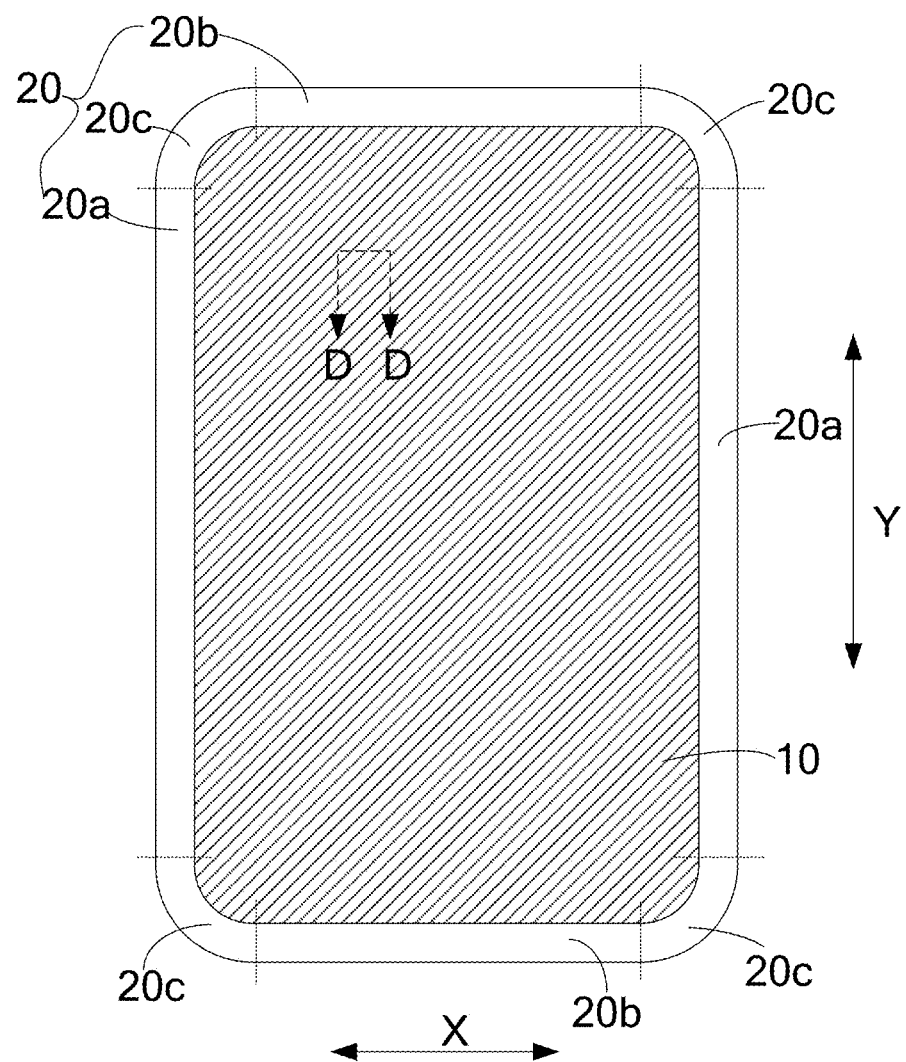
FIG. 1 illustrates a structural schematic diagram of a flexible display device according to some embodiments of the present disclosure.

In order to make the objectives, technical solutions, and advantages of the present disclosure clearer, the embodiments of the present disclosure will be described in detail below in conjunction with the accompanying drawings. It should be noted that the embodiment can be implemented in a number of different forms. Those skilled in the art can easily understand a fact that way and content can be transformed into various forms without departing from the purpose and scope of the present disclosure. Therefore, the present disclosure should not be interpreted as being limited to the content described in the following embodiments. In the case of no conflict, the embodiments in the present disclosure and the features in the embodiments can be combined with each other arbitrarily.

In the drawings, the size of each constituent element, the thickness of layer, or area may be exaggerated for the sake of clarity. Therefore, an implementation of the present disclosure is not necessarily limited to such size, and the shape and size of each component in the drawings do not reflect the true scale. In addition, the drawings schematically illustrate ideal examples, and an implementation of the present disclosure is not limited to the shapes, numerical values, and the like as shown in the drawings.

The "first". "second", "third" and other ordinal numbers in the present specification are used to avoid confusion of constituent elements, but not to limit in quantity.

In the present specification, for convenience, words indicating orientation or position relationship such as "middle region", "both side areas", "upper", "inside" and "outside" or the like are used to indicate the position relationship of constituent elements with reference to the drawings, and this is only for ease of description of the present specification and simplification of the description, rather than indicating or implying that the referred device or element must have a specific orientation, or be constructed and operated in a particular orientation, and therefore this cannot be understood as a limitation to the present disclosure. The position relationship of the constituent elements is appropriately changed according to the direction in which each constituent element is described. Therefore, it is not limited to the words described in the present specification, and can be replaced as appropriate according to situations.

In the present specification, the terms "installed". "connected" and "coupled" shall be broadly understood unless otherwise explicitly specified and defined. For example, it may be fixedly connected, or may be removable connected, or integrally connected; it may be mechanically connected, or may be electrically connected; it may be directly connected, or may be indirectly connected through middleware, or may be internal connection between two elements. Those of ordinary skill in the art can understand the specific meanings of the above mentioned terms in the present disclosure according to specific situations.

In the present disclosure, unless otherwise specified, the term "disposed on the same layer" used means that two layers, components, members, elements or parts may be formed by the same patterning process, and the two layers, components, members, elements or parts are generally formed of the same material.

In the present disclosure, unless otherwise specified, an expression "patterning process" generally includes steps of photoresist coating, exposure, development, etching, and photoresist stripping, and the like. An expression "one patterning process" means a process of forming patterned layers, components, members, and the like, by using one mask.

The present disclosure provides a flexible display device according to some embodiments. As shown in FIG. 1, the flexible display device 1 has a display area 10 and a peripheral area 20 arranged around the display area 10. The peripheral area 20 includes a first lateral area 20a extending in a first direction Y, a second lateral area 20b extending in a second direction X, and an arc-shaped corner area 20c located between the first lateral area 20a and the second lateral area 20b.

As shown in FIG. 1, the shape of the orthographic projection, of the flexible display device 1 in the embodiment of the present disclosure, on the reference plane may be substantially rectangular, that is, the flexible display device 1 may include two first lateral areas 20a opposite in the second direction X, two second lateral areas 20b opposite in the first direction Y, and four arc-shaped corner areas 20c.

It should be noted that, in some embodiments of the present disclosure, the first direction Y may intersect with the second direction X, and optionally, the first direction Y and the second direction X are orthogonal. In addition, the reference plane mentioned in the embodiments of the present disclosure is a plane parallel to the first direction Y and the second direction X.

Figure 2:
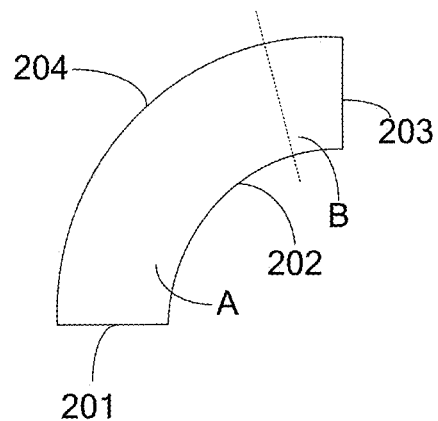
FIG. 2 illustrates a structural schematic diagram of an arc-shaped corner area in the flexible display device according to some embodiments of the present disclosure.

As shown in FIG. 1, the first lateral area 20a and the second lateral area 20b may be rectangular, which is not limited thereto and may be in other shapes. And as shown in FIG. 2, an arc-shaped corner area 20c has a first side 201, an inner arc side 202, a second side 203 and an outer arc side 204 which are connected end to end sequentially, with the first side 201 being connected with the first side area 20a, and the second side 203 being connected with the second side area 20b.

It should be noted that, since the first lateral area 20a and the second lateral area 20b, in the embodiments of the present disclosure, may be rectangular, the first side 201 connected with the first lateral area 20a and the second side 203 connected with the second lateral area 20b may be straight sides, which are not limited thereto and the first side 201 and the second side 203 may be determined according to the shapes of the first lateral area 20a and the second lateral area 20b.

Figure 3:
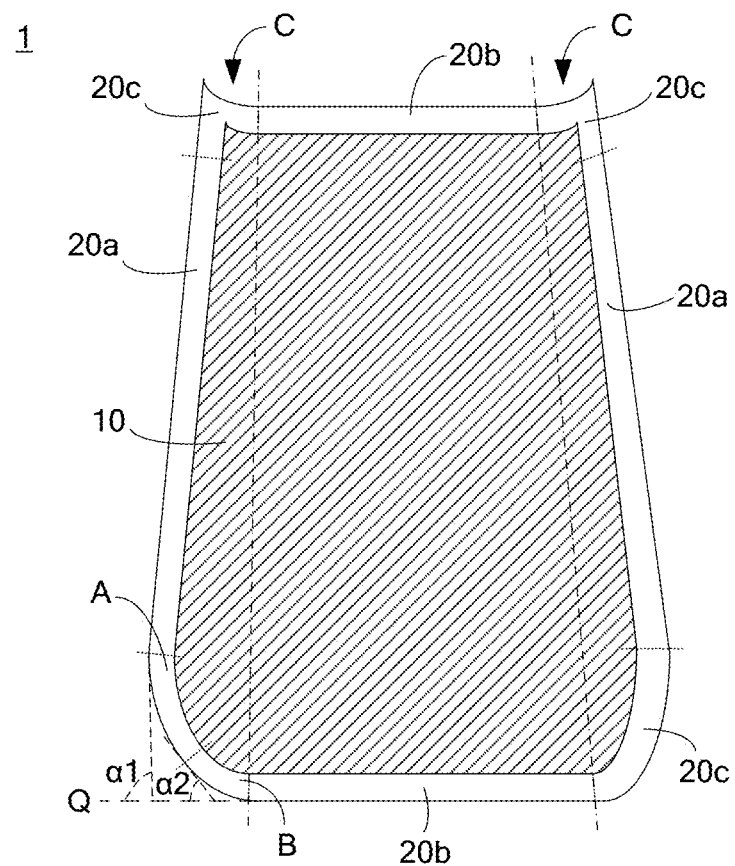
FIG. 3 illustrates a structural schematic diagram of the flexible display device with the edge is in a bent state according to some embodiments of the present disclosure.

In some embodiments of the present disclosure, the edge of the flexible display device 1 can be bent to form a bending region C as shown in FIG. 3. The bending region C may include the first lateral area 20a and the arc-shaped corner area 20c as shown in FIG. 1, and may further include a part of the display area 10 close to the first lateral area 20a and the arc-shaped corner area 20c, to implement a curved display. In detail, the first lateral area 20a of the flexible display device 1 may be bent in a direction away from the display side of the flexible display device 1, and it should be understood that when the first lateral area 20a is bent in the direction away from the display side of the flexible display device 1, the arc-shaped corner area 20c and the display area 10 are also bent along with the first lateral area 20a in the direction away from the display side of the flexible display device 1.

Since the corner area in the flexible display device 1 of some embodiments of the present disclosure is arc-shaped, when the flexible display device 1 is bent, the stress on the arc-shaped corner area 20c may be much greater than the stress on the first lateral area 20a, making arc-shaped corner area 20c prone to cracking, thereby affecting product performance and the reliability of the product. In addition, the arc-shaped corner area 20c is also prone to cracking when pressed by external forces.

As shown in FIG. 2, the arc-shaped corner area 20c of some embodiments of the present disclosure may include a first corner area A having the first side 201 and a second corner area B having the second side 203, that is, the first corner area A is close to the first lateral area 20a and the second corner area B is close to the second lateral area 20B. In particular, as shown in FIG. 2, the first corner area A and the second corner area B may share one straight side, the first corner area A may include a part of the inner arc side 202 and a part of the outer arc side 204, and the second corner area B may include another part of the inner arc side 202 and another part of the outer arc side 204.

It should be noted that the center of the arc-shaped corner area 20c is located in the first corner area A. In addition, it should be understood that, since the first corner area A is closer to the first lateral area 20a than the second corner area B, as shown in FIG. 3, when the first lateral area 20a of the flexible display device 1 is bent in a direction away from the display side of the flexible display device 1, the bending angle α1 of the first corner area A is greater than the bending angle α2 of the second corner area B. The bending angle may be an included angle between the tangent of the bending end of the first corner area A or the second corner area B and the reference plane. It should be noted that the dotted line Q in FIG. 3 is located in the reference plane.

It is found through experimental analysis that, when the first lateral area 20a of the flexible display device 1 is bent in a direction away from the display side of the flexible display device 1, the entire first corner area A is subjected to a greater stress compared to the entire second corner area B, that is, the first corner area A is more prone to cracking compared to the second corner area B.

Based on the above, in order to improve the situation where cracks occur at the arc-shaped corner area 20c, the structure of the flexible display device 1 at the arc-shaped corner area 20c is improved by the embodiments of the present disclosure, as follows.

Figure 4:
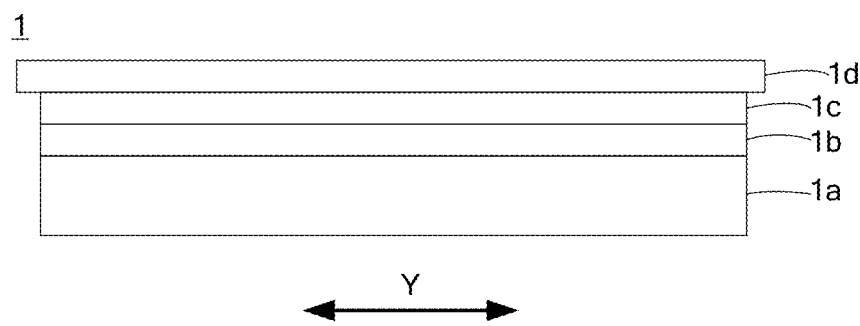
FIG. 4 illustrates a structural schematic diagram of the flexible display device in one perspective according to some embodiments of the present disclosure.

As shown in FIG. 4, the flexible display device 1 of the embodiment of the present disclosure may include a display substrate 1a, a polarizer 1b, and a first optical adhesive layer 1c that are sequentially stacked, and the display substrate 1a, the polarizer 1b, and the first optical adhesive layer 1c are located in the display area 10 and the peripheral area 20. It should be noted that the display substrate 1a may be an Organic Light-Emitting Diode (OLED) display, which is not limited thereto.

As shown in FIG. 4, the flexible display device 1 may further include a cover plate 1d, which is located on the side of the first optical adhesive layer 1c away from the polarizer 1b. Specifically, the cover plate 1d may be adhered with the polarizer 1b through the first optical adhesive layer 1c. It should be noted that the outer contours of the orthographic projections of the display substrate 1a, the polarizer 1b and the first optical adhesive layer 1c on the reference plane should be located within the outer contour of the orthographic projection of the cover plate 1d on the reference plane. It should be understood that there are tolerances in the material, cutting, etc. of the display substrate 1a, the polarizer 1b and the first optical adhesive layer 1c, but the slight decorating of the outline of the display substrate 1a, the polarizer 1b and the first optical adhesive layer 1c does not affect the outline of the flexible display device 1, because the outline of the flexible display device 1 is mainly reflected in the cover plate 1d.

In addition, it should be noted that the outer contours of the orthographic projections of the polarizer 1b and the first optical adhesive layer 1c on the reference plane may also overlap with the outer contour of the orthographic projection of the cover plate 1d on the reference plane, depending on the specific circumstances.

Figure 5:
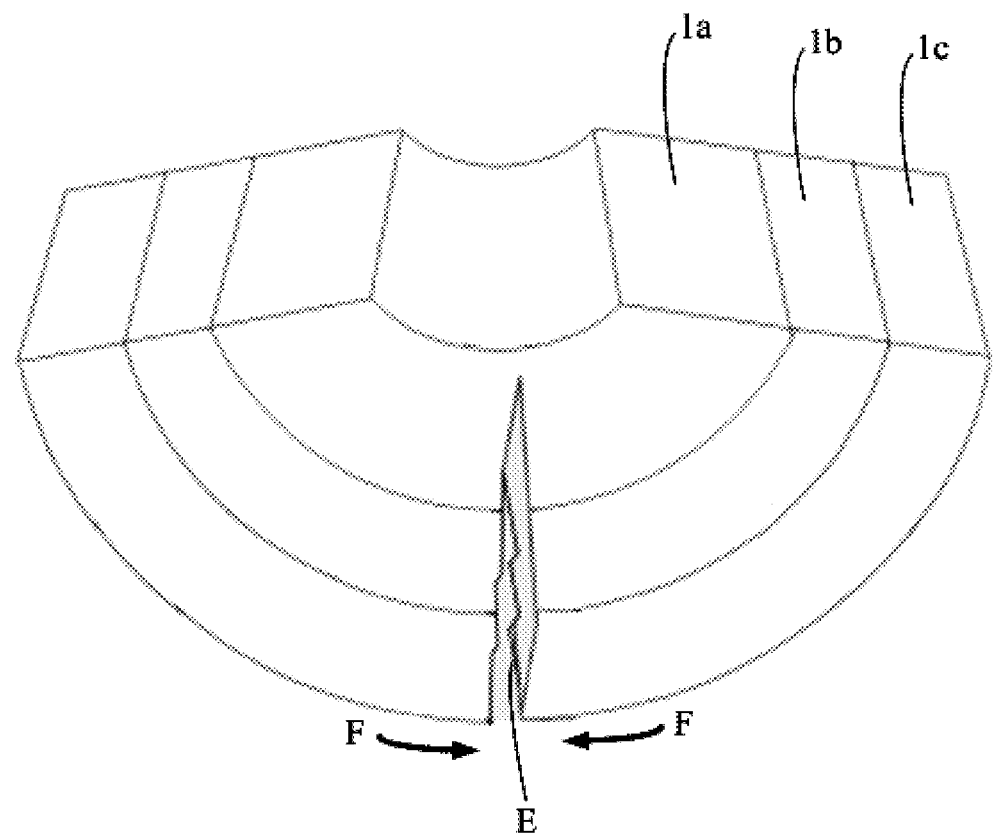
FIG. 5 illustrates a principle diagram of crack generation when the flexible display device is bent according to some embodiments of the present disclosure.

Since the flexible display device 1 is in a flat plate structure before being bent, when the first side area 20a of the flexible display device 1 is bent in the direction away from the display side of the flexible display device 1, the flexible display device 1 is mainly affected by tensile stress, as shown in FIG. 5, the surfaces of the display substrate 1a, the polarizer 1b and the first optical adhesive layer 1c are all subjected to the tensile stress F. In particular, the material of the polarizer 1b and the first optical adhesive layer 1c in the embodiment of the disclosure is an organic insulating material. Since the material of the polarizer 1b and the first optical adhesive layer 1c is an organic insulating material, the polarizer 1b and the first optical adhesive layer 1c have good flexibility and are not prone to breakage during the bending process. However, the display substrate 1a is generally formed of a variety of materials, for example, inorganic insulating materials, organic insulating materials, metal materials and the like. Since the inorganic insulating materials have the characteristics of hardness and brittleness, the inorganic insulating layer in the display substrate 1a are easy to break after being subjected to tensile stress during the bending process, particularly the inorganic insulating layer in the arc-shaped corner area 20c. After the crack is generated, and with the stress release, it may extend to other film layers and the display areas, forming cracks E.

As mentioned above, when the first lateral area 20a of the flexible display device 1 is bent in the direction away from the display side of the flexible display device 1, the stress on the first corner area A is relatively high. Therefore, in order to avoid cracks in the first corner area A during bending, the first corner area A may be designed so that the polarizer 1b and/or the first optical adhesive layer 1c may be extended beyond the display substrate 1a, as shown in FIG. 6, that is, in the first corner area A, the outer contour(s) of the orthographic projection(s) of the polarizer 1b and/or the first optical adhesive layer 1c on the reference plane is/are located outside the outer contour of the orthographic projection of the display substrate 1a on the reference plane, such that when the first side area 20a of flexible display device 1 is bent in the direction away from the display side of flexible display device 1, the polarizer 1b and/or the first optical adhesive layer 1c at the first corner area A firstly subjected to the tensile stress on the product surface, thereby achieving the purpose of protecting the display substrate 1a, so as to improve the situation that the display substrate 1a in the first corner area A is prone to cracking when bending, thereby improving the situation that the whole arc-shaped corner area 20c is easy to crack when being bent, and improving the product yield and the reliability.

Optionally, in the first corner area A, the outer contours of the orthographic projections of the polarizer 1b and the first optical adhesive layer 1c on the reference plane may be located outside the outer contour of the orthographic projection of the display substrate 1a on the reference plane, so as to achieve the purpose of protecting the display substrate 1a, and to improve the situation that the first corner area A is easy to crack when being bent. Further, the outer contour of the orthographic projection of the polarizer 1b on the reference plane may overlap with the outer contour of the orthographic projection of the first optical adhesive layer 1c on the reference plane, so that the design difficulty is reduced.

It should be understood that, when the first lateral area 20a of the flexible display device 1 is bent in the direction away from the display side of the flexible display device 1, not only the stress on the whole first corner area A is different from the stress on the whole second corner area B, but also the magnitude of the stress on different regions in the first corner area A is different.

Figure 6:
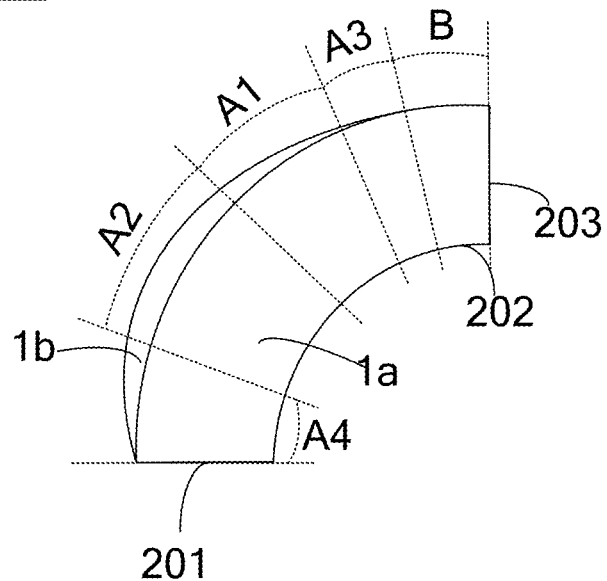
FIG. 6 illustrates a structural schematic diagram of an arc-shaped corner area in the flexible display device according to some embodiments of the present disclosure.

In some embodiments of the present disclosure, as shown in FIG. 6, the first corner area A may include a first sub-area A1 and a second sub-area A2 located at the first sub-area A1 close to the first lateral area 20a, where the center of the arc-shaped corner area 20c is located in the first sub-area A1. It is found through experimental analysis that, when the first lateral area 20a of the flexible display device 1 is bent in the direction away from the display side of the flexible display device 1, the stress on the second sub-area A2 is greater than the stress on the first sub-area A1. Therefore, in order to save the space occupied by the polarizer 1b and reserve more design space for other designs, the distance of the polarizer 1b extending beyond the edge of the display substrate 1a at the position with greater stress can be made larger, and the distance of the polarizer 1b extending beyond the edge of the display substrate 1a at the position with smaller stress can be smaller. That is, in the first sub-area A1, there is a first distance between the outer contour of the orthographic projection of the polarizer 1b on the reference plane and the outer contour of the orthographic projection of the display substrate 1a on the reference plane; in the second sub-area A2, there is a second distance between the outer contour of the orthographic projection of the polarizer 1b on the reference plane and the outer contour of the orthographic projection of the display substrate 1a on the reference plane; where the second distance is greater than the first distance.

As shown in FIG. 6, the first corner area A may further include a third sub-area A3 and a fourth sub-area A4. The third sub-area A3 is located on the side of the first sub-area A1 close to the second corner area B, and the fourth sub-area A4 is located on the side of the second sub-area A2 close to the first lateral area 20a. It is found through experimental analysis that, when the first lateral area 20a of the flexible display device 1 is bent in the direction away from the display side of the flexible display device 1, the stress on the third sub-area A3 is less than the stress on the first sub-area A1, and the stress on the fourth sub-area A4 is less than the stress on the second sub-area A2. In order to further save the space occupied by the polarizer 1b and reserve more design space for other designs, in some embodiments of the present disclosure, in the third sub-area A3, there is a third distance between the outer contour of the orthographic projection of the polarizer 1b on the reference plane and the outer contour of the orthographic projection of the display substrate 1a on the reference plane; in the fourth sub-area A4, there is a fourth distance between the outer contour of the orthographic projection of the polarizer 1b on the reference plane and the outer contour of the orthographic projection of the display substrate 1a on the reference plane; where the third distance is smaller than the first distance and the fourth distance is smaller than the second distance.

Based on the above, the distance of the polarizer 1b extending beyond the edge of the display substrate 1a may vary according to the stress variation trend, so that the polarizer 1b can protect the display substrate 1a in the first corner area A while saving the space occupied by the polarizer 1b for the purpose of reserving more design space for other designs.

It should be noted that when the first lateral area 20a is bent in the direction away from the display side of the flexible display device 1, without interference from external forces, the position with the maximum stress in the third sub-area A3 is the position connected with the first sub-area A1, the position with the maximum stress in the first sub-area A1 is the position connected with the second sub-area A2, further, the position with the maximum stress in the first sub-area A1 is the center of the display substrate 1a in the arc-shaped corner area 20c; the position with the minimum stress in the second sub-area A2 is the position connected with the fourth sub-area A4; and the position with the maximum stress in the fourth sub-area A4 is the position connected with the position with the minimum stress in the second sub-area A2. The first distance, the second distance, the third distance and the fourth distance refer to the lengths of the polarizer 1b extending beyond the edge of the display substrate 1a at the position with the maximum stress in each sub-area, respectively. In addition, the length of the polarizer 1b extending beyond the edge of the display substrate 1a gradually increases or decreases from the position of one sub-area with the maximum stress to the position of the adjacent sub-area with the maximum stress. For example, from the position of the first sub-area A1 with the maximum stress to the position of the second sub-area A2 with the maximum stress, the length of the polarizer 1b extending beyond the edge of the display substrate 1a gradually increases.

When the first lateral area 20a of the flexible display device 1 is bent in the direction away from the display side of the flexible display device 1, the second corner area B is less stressed and is not easy to crack here, so that the purpose of saving the space occupied by the polarizer 1B and reserving more design space for other designs can be further achieved. In the second corner area B, as shown in FIG. 6, the outer contours of the orthographic projections of the polarizer 1B and the first optical adhesive layer 1c on the reference plane may overlap with the outer contour of the orthographic projection of the display substrate 1a on the reference plane.

Without limitation, in the second corner area B, the outer contours of the orthographic projections of the polarizer 1b and the first optical adhesive layer 1c on the reference plane may also extend beyond the outer contour of the orthographic projection of the display substrate 1a on the reference plane, depending on the specific circumstances.

It should be noted that the present disclosure may not only improve the situation that cracks are easy to occur in the arc-shaped corner area by changing the size of the polarizer 1b and/or the first optical adhesive layer 1c, but also improve the situation that cracks are easy to occur by improving the structure of the display substrate 1a in the arc-shaped corner area, specifically as follows.

Figure 7:
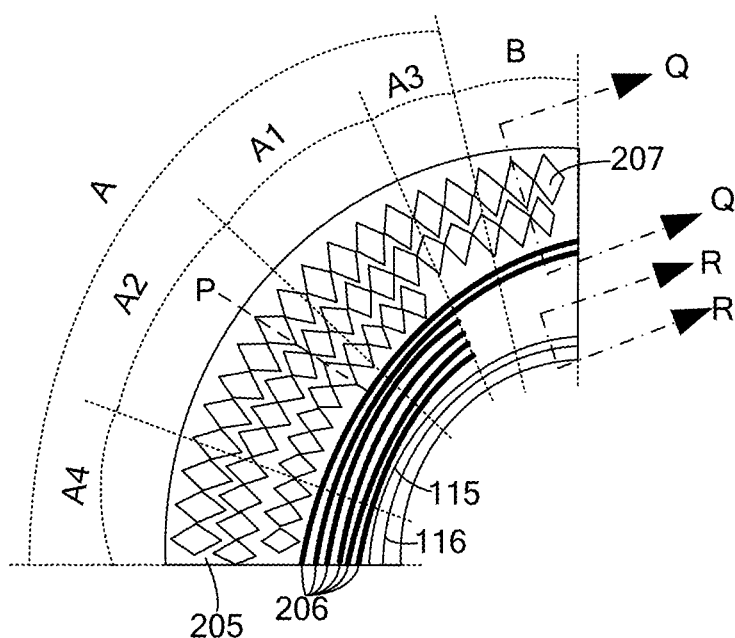
FIG. 7 illustrates a structural schematic diagram of an arc-shaped corner area in the flexible display device according to some embodiments of the present disclosure.

In some embodiments of the present disclosure, as shown in FIG. 7, the display substrate 1a may include an anti-crack base 205, an anti-crack retaining wall 206 and a plurality of anti-crack blocks 207 that are at least located in the first corner area A. The anti-crack retaining wall 206 is formed on the anti-crack base 205 and located outside of the display area 10. The plurality of anti-crack blocks 207 are formed on the anti-crack base 205 and located on the side of the anti-crack retaining wall 206 away from the display area 10. It should be noted that, as shown in FIG. 7, the anti-crack base 205, the anti-crack retaining wall 206 and the plurality of anti-crack blocks 207 may also be located in the second corner area B.

In some embodiments of the present disclosure, the cracks can be blocked by disposing the anti-crack block 207 and the crack retaining wall 206, so as to prevent the cracks from extending to the display area, thereby preventing the display area from generating black spots and the like, and improving the reliability and the product yield. In addition, the plurality of anti-crack blocks 207 arranged according to certain requirements can not only achieve the purpose of blocking the cracks, but can also guide the cracks to further mitigate the extension of cracks to other film layers or display areas.

In detail, as shown in FIG. 7, the plurality of anti-crack blocks 207 according to some embodiments of the present disclosure may be divided into at least two rows of the anti-crack block groups, and each row of the anti-crack block groups includes at least two anti-crack blocks 207 which are arranged according to the outer contour of the orthographic projection, of the part of the display substrate 1a located in the arc-shaped corner area 20c, on the reference plane. The middle regions of two adjacent anti-crack blocks 207 in each row of the anti-crack block groups are contacted, and there is a gap between the side areas of the middle regions, that is, weak area is between two adjacent anti-crack blocks 207 in each row of the anti-crack block groups. According to the characteristic that cracks are easy to occur in the weak area, the cracks change direction in a certain proportion at the edges of the anti-crack blocks 207, and the cracks may pass through the weak area along the side walls of the anti-crack blocks 207 after the direction change, therefore, the extension direction of the cracks may be changed due to this design. Accordingly, the extension path of the cracks can be increased to play the roles of guiding, evacuating and releasing stress energy, so as to mitigate the extension of the cracks to display areas and other film layers.

Figure 12:
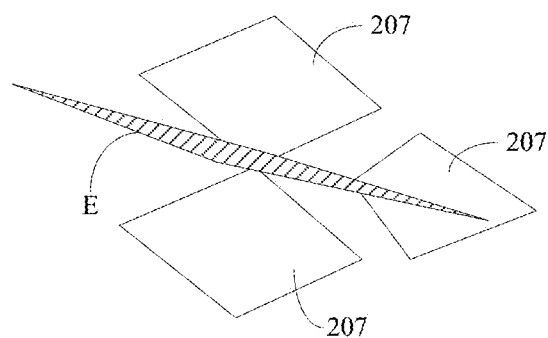
FIG. 12 illustrates a schematic diagram of the anti-crack block blocking crack extension according to some embodiments of the present disclosure.

As shown in FIG. 7, in two adjacent rows of the anti-crack block groups, the anti-crack block 207 in one row of the anti-crack block groups corresponds to the gap between two adjacent anti-crack blocks in another row of the anti-crack block groups, so that the crack E, after passing through the weak area of one row of the anti-crack block groups, meets the anti-crack block 207 of the next row of the anti-crack block groups, and thus the crack E can be completely prevented from continuing to extend to the display area, as shown in FIG. 12.

Figure 13:
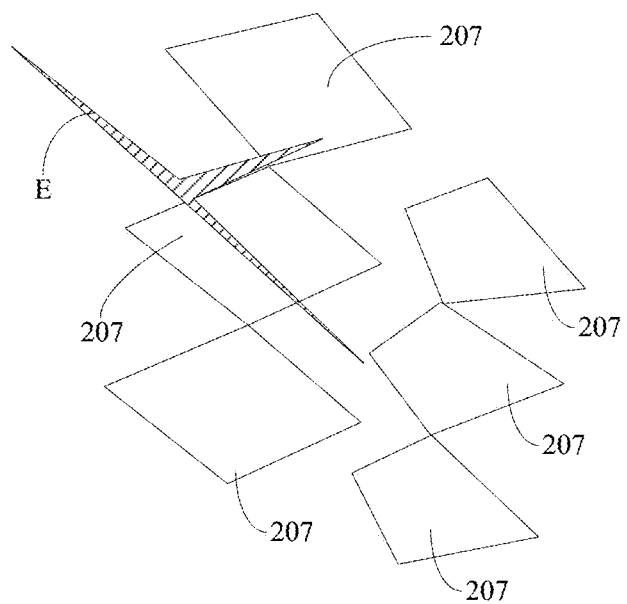
FIG. 13 illustrates a schematic diagram of the anti-crack blocks blocking crack extension according to some embodiments of the present disclosure.

In addition, as shown in FIG. 13, part of the crack stress releases large energy, which can be bifurcated at the side wall of the anti-crack block 207, so the energy is dispersed and a part of the energy passes through one row of the anti-crack block groups in the original direction, and the crack energy is small after bifurcation, even if the crack passes through one row of the anti-crack block groups, it will meet the non-weak area of the next row of the anti-crack block groups, and the anti-crack block 207 in the next row completely blocks the cracks.

It should be noted that, if the cracks are caused by external pressure and have a strong penetration capability, the anti-crack block groups may be arranged in three rows or more than three rows, so that the cracks may be further guided to completely prevent the cracks from continuing to extend. In addition, it should be noted that the middle region between two adjacent anti-crack blocks 207 in each row of the anti-crack block groups may be point contact, but is not limited thereto, and may also be line contact, depending on the specific circumstances.

In some embodiments, as shown in FIG. 7, the orthographic projection of the anti-crack block 207 on the reference plane may include a first point and a second point that are farthest apart. In the two adjacent rows of the anti-crack block groups, the first point and the second point of the anti-crack block 207 in one row of the anti-crack block groups 207 and the contact point between two adjacent anti-crack blocks 207 in another row of the anti-crack block groups 207 may be located on the same straight line P, so that after a crack passes through one row of the anti-crack block groups, the crack will meet the strongest blocking area of the next row of the anti-crack block groups (namely, the area with the largest size in the anti-crack block 207), and the crack can be better prevented from extending continuously in the display area.

Optionally, a shape of the orthographic projection of the anti-crack block 207 on the reference plane is a quadrangle, where the quadrangle has a first diagonal and a second diagonal, two end points of the first diagonal are the first point and the second point, and the length of the first diagonal is greater than that of the second diagonal. In addition, the outer contour of the orthographic projection of the part of the display substrate 1a located in the arc-shaped corner area 20c on the reference plane is an arc line.

Figure 8:
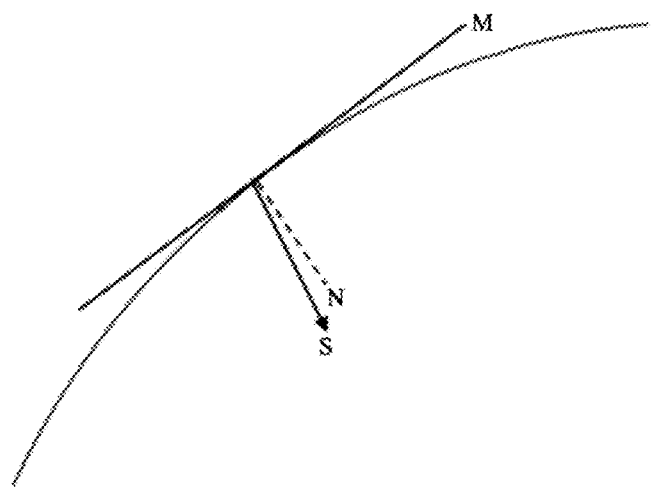
FIG. 8 illustrates a schematic diagram of relation between crack direction and normal of the corresponding part of arc-shaped corner area of the flexible display device during bending process according to some embodiments of the present disclosure.
Figure 14:
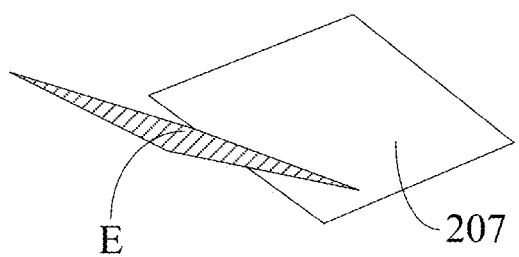
FIG. 14 illustrates a schematic diagram of the anti-crack block blocking crack extension according to some embodiments of the present disclosure.

It is found through experimental analysis that, due to the influence of the resultant stress and the coating direction of the film layer itself, as shown in FIG. 8, there is a certain included angle between the crack direction S generated during bending and the direction of the normal N (the normal N is a line perpendicular to the tangent M) of the corresponding portion. Therefore, in order to enable the anti-crack block 207 to better block the cracks, in the design, the first diagonal of the anti-crack block 207 may be parallel to the crack direction S, as shown in FIG. 14. That is, there is a certain included angle between the first diagonal of the anti-crack block 207 and the normal to the tangent point corresponding to the first diagonal on the aforementioned arc line, and it should be understood that the included angle is an acute angle, further, the included angle between the first diagonal and the normal to the tangent point corresponding to the first diagonal on the arc line ranges from 5° to 30°, such as 5°, 10°, 15°, 20°, 25°, 30°, etc.

For example, the quadrangle may be symmetrically arranged with respect to the first diagonal, so that the plurality of the anti-crack blocks 207 may be arranged according to the contour of the outer arc side, which is not limited thereto and the shape of the quadrangle may also be adjusted according to actual situations.

A shape of the orthographic projection of the anti-crack block 207 in the anti-crack block group closest to the outer arc side 204 on the reference plane is a rhombus to better play the roles of guiding, evacuating and releasing stress energy, so that the extension of cracks to the display areas and other film layers can be mitigated. It should be noted that the anti-crack block 207 in the other anti-crack block groups may also be a rhombus, but is not limited thereto, and the shape of the anti-crack block 207 may also be adjusted according to actual requirements.

In some embodiments of the present disclosure, as shown in FIG. 7, multiple rows of the anti-crack block groups may be located in the first corner area A. and part of the multiple rows of the anti-crack block groups away from the display area 10 may extend to the second corner area B. That is, the number of rows of the anti-crack block groups at the second corner area B is less than the number of rows of the anti-crack block groups at the first corner area A, and the anti-crack block groups at the second corner area B are disposed close to the outer arc side 204. Since the stress on the first corner area A is greater than the stress on the second corner area B when the first lateral area 20a of the flexible display device 1 is bent in the direction away from the display side of the flexible display device 1, the cracks can be effectively prevented from extending into the display area by providing more rows of the anti-crack block groups at the first corner area A, while the second corner area B is provided with fewer rows of the anti-crack block groups, so that more space for arranging other wires can be saved while the cracks are effectively prevented from extending into the display area.

For example, there are three rows of the anti-crack block groups provided in the first corner area A, where two rows of the anti-crack block groups of the three rows of the anti-crack block groups close to the outer arc side 204 extend to the second corner area B. That is, there can be three rows of the anti-crack block groups located in the first corner area A and two rows of the anti-crack block groups located in the first corner area B, and the two rows of the anti-crack block groups in the second corner area B and the outermost two rows of the anti-crack block groups in the first corner area A are arranged in a one-to-one correspondence manner.

It should be noted that the row number of the anti-crack block groups in the first corner area A and the second corner area B is not limited to the above, and may be more, depending on the specific circumstances.

In some embodiments, as shown in FIG. 7, there may be provided with a plurality of circles of the anti-crack retaining walls 206, with a gap between two adjacent circles of the anti-crack retaining walls 206, where the plurality of circles of the anti-crack retaining walls 206 are in the first corner area A, and in the plurality of circles of the anti-crack retaining walls 206, the part of the anti-crack retaining walls 206 away from the display area 10 extends to the second corner area B, the first lateral area 20a and the second lateral area 20b. Since the stress on the first corner area A is greater than the stress on the second corner area B when the first lateral area 20a of the flexible display device 1 is bent in the direction away from the display side of the flexible display device 1, the cracks can be effectively prevented from extending into the display area by designing a plurality of circles of the anti-crack retaining walls 206 at the first corner area A, while the second corner area B is provided with fewer circles of the anti-crack retaining walls 206, so that more space for arranging other wires can be saved while the cracks are effectively prevented from extending into the display area.

For example, as shown in FIG. 7, the second corner area B, the first lateral area 20a and the second lateral area 20b may be provided with two circles of the anti-crack retaining walls 206, and the first corner area A may be provided with six circles of the anti-crack retaining walls 206, where the anti-crack retaining walls 206 in the second corner area B, the first lateral area 20a and the second lateral area 20b are close to the outer arc side 204, and are integrally formed into an annular structure with the corresponding anti-crack retaining walls 206 in the first corner area A, so as to better protect the display area 10.

It is found through experimental analysis that, when the first lateral area 20a of the flexible display device 1 is bent in the direction away from the display side of the flexible display device 1, the stress on the first sub-area A1, the second sub-area A2, and the fourth sub-area A4 is relatively large. Therefore, as shown in FIG. 7, the first sub-area A1, the second sub-area A2, and the fourth sub-area A4 may be provided with three rows of the anti-crack block groups and six circles of the anti-crack retaining walls 206, while since the stress on the third sub-area A3 is relatively small, as shown in the figure, the third sub-area A3 may be provided with two rows of the anti-crack block groups and two circles of the anti-crack retaining walls 206.

In addition, it should be understood that the part of the display substrate 1a located in the peripheral area 20 may include not only the anti-crack base 205, the anti-crack block 207 and the anti-crack retaining wall 206, but it may further include circuit structures such as signal traces (not shown).

Since the inorganic insulating layer is prone to crack when being bent, in some embodiments of the present disclosure, in order to prevent the crack from occurring, the anti-crack base 205, the anti-crack block 207, and the anti-crack retaining wall 206 are made of organic materials with good flexibility, and specifically, the anti-crack base 205, the anti-crack block 207, and the anti-crack retaining wall 206 each is composed of at least one organic film layer. In order to reduce the process cost, the organic film layers in the anti-crack base 205, the anti-crack block 207, and the anti-crack retaining wall 206 may be disposed on the same layer as the film layer made of organic materials in the display area.

Figure 9:
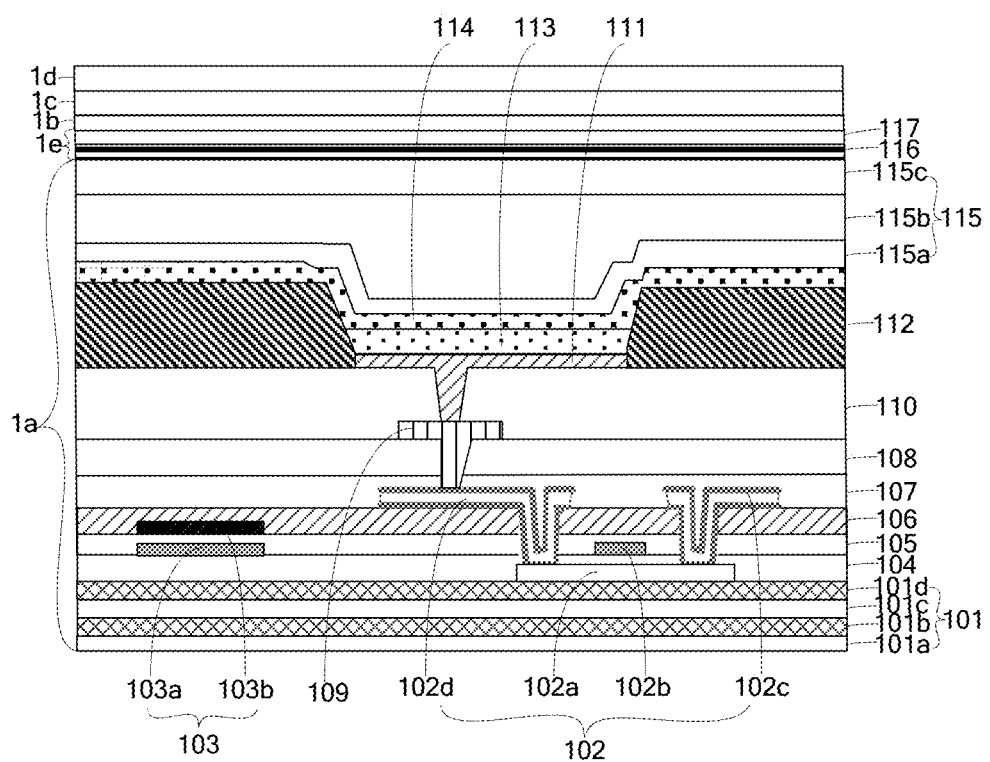
FIG. 9 illustrates a cross-sectional schematic diagram along the D-D line as shown in FIG. 1.

For example, as shown in FIG. 9, in the display area 10, the display substrate 1a may include a flexible base 101, and the flexible base 101 includes a first organic base layer 101a, an inorganic barrier layer 101b, a second organic base layer 101c, and an inorganic buffer layer 101d which are sequentially stacked. The materials of the first organic base layer 101a and the second organic base layer 101c may include one or more of: polyimide (PI), polyethylene terephthalate (PET), and polycarbonate (PC). The materials of the inorganic barrier layer 101b and the inorganic buffer layer 101d may include any one or a more of: silicon oxide (SiOx), silicon nitride (SiNx), and silicon oxynitride (SiON).

The anti-crack base 205 is integrally formed with at least one of the first organic base layer 101a and the second organic base layer 101c. Optionally, as shown in FIG. the anti-crack base 205 includes a first layer 205a integrally formed with the first organic base layer 101a and a second layer 205b integrally formed with the second organic base layer 101c.

It should be noted that, in the display area 10, the flexible base 101 is not limited to include the above-described film layers, and may include only one organic base layer, or may be provided with more organic base layers and inorganic insulating layers. In addition, the flexible base 101 may also extend to a part of the peripheral area 20, but is not limited thereto, depending on the specific circumstances.

In some embodiments of the present disclosure, the display substrate 1a may further include a driving circuit layer and a light emitting structure layer in the display area 10. The driving circuit layer is disposed on the inorganic buffer layer 101d, and the light emitting structure layer is disposed on the side of the driving circuit layer away from the inorganic buffer layer 101d.

In detail, as shown in FIG. 9, the driving circuit layer may include a thin film transistor 102 and a capacitor 103. The thin film transistor 102 may include an active layer 102a, a gate electrode 102b, a source electrode 102c, and a drain electrode 102d. The capacitor 103 may include a first polar plate 103a and a second polar plate 103b located on the side of the first polar plate 103a facing away from the flexible base 101, and the first polar plate 103a may be disposed on the same layer as the gate electrode 102b. For example, the materials of the active layer 102a may be various materials such as amorphous indium gallium zinc oxide (a-IGZO), zinc oxynitride (ZnON), Indium Zinc Tin Oxide (IZTO), amorphous silicon (a-Si), polysilicon (p-Si), hexathiophene, and polythiophene. The materials of the gate electrode 102b, the source electrode 102c, the drain electrode 102d, the first polar plate 103a, and the second polar plate 103b may be metal materials, such as any one or more of: silver (Ag), copper (Cu), aluminum (Al), titanium (Ti), and molybdenum (Mo), or an alloy material of the above metals, such as aluminum neodymium (AlNd) alloy or molybdenum niobium (MoNb) alloy, which may be a single-layer structure, or a multi-layer composite structure, such as Mo/Cu/Mo, Ti/Al/Ti, etc.

It should be noted that the driving circuit layer may further include a gate insulating layer 104, a capacitor insulating layer 105, an interlayer dielectric layer 106, and a passivation layer 107. The gate insulating layer 104 is located between the active layer 102a and the gate electrode 102b. The capacitor insulating layer 105 is located between the gate electrode 102b and the second polar plate 103b. The interlayer dielectric layer 106 is located on the side of the second polar plate 103b facing away from the flexible base 101. Via holes penetrating through the gate insulating layer 104, the capacitor insulating layer 105 and the interlayer dielectric layer 106 are provided on the gate insulating layer 104, the capacitor insulating layer 105 and the interlayer dielectric layer 106, and the source electrode 102c and the drain electrode 102d are electrically connected with the active layer 102a through the via holes. The passivation layer 107 covers the source electrode 102c and the drain electrode 102d.

It should be understood that the gate insulating layer 104, the capacitor insulating layer 105, the interlayer dielectric layer 106 and the passivation layer 107 may be located not only in the display area 10 but also in a part of the peripheral area 20.

As shown in FIG. 9, the light emitting structure layer may include a first planarization layer 108, a transfer electrode 109, a second planarization layer 110, an anode 111, a pixel defining layer 112, an organic light emitting layer 113 and a cathode 114. The first planarization layer 108 is formed on the side of the passivation layer 107 facing away from the flexible base 101, i.e., the first planarization layer 108 may cover the thin film transistor 102 and the capacitor 103. The transfer electrode 109 is formed on the first planarization layer 108 and is electrically connected with the thin film transistor 102, and specifically, with the drain electrode 102d of the thin film transistor 102, through the via holes on the first planarization layer 108 and the passivation layer 107. The second planarization layer 110 covers the transfer electrode 109. The anode 111 is formed on the side of the second planarization layer 110 facing away from the flexible base 101 and is electrically connected with the transfer electrode 109 through the via hole on the second planarization layer 110. The pixel defining layer 112 is formed on the second planarization layer 110, and a pixel opening exposing the anode 111 is formed on the pixel defining layer 112. The organic light emitting layer 113 is at least partially located within the pixel opening and in contact with the anode 111. The cathode 114 is provided as an entire surface and covers the pixel defining layer 112 and the organic light emitting layer 113.

For example, the materials of the first planarization layer 108, the second planarization layer 110 and the pixel defining layer 112 are organic materials, including PI, acryl, polyethylene terephthalate, or the like. The material of the transfer electrode 109 is a metal material, such as any one or more of: Ag, Cu, Al, Ti, and Mo, or an alloy material of the above metals. The material of the anode 111 may be ITO or IZO or the like. The organic light emitting layer 113 includes a hole injection layer, a hole transport layer, a light emitting layer, an electron transport layer, and an electron injection layer that are stacked. The material of the cathode 114 may include any one or more of: magnesium (Mg), silver (Ag), aluminum (Al), copper (Cu), and lithium (Li), or an alloy material of the above one or more metals.

It should be noted that the transfer electrode 109 and the second planarization layer 110 may not be provided in the display substrate 1a in some embodiments of the present disclosure, that is, the anode 111 may be formed on the first planarization layer 108 and connected with the drain electrode 102d of the thin film transistor 102 through the via holes on the first planarization layer 108 and the passivation layer 107.

Figure 11:
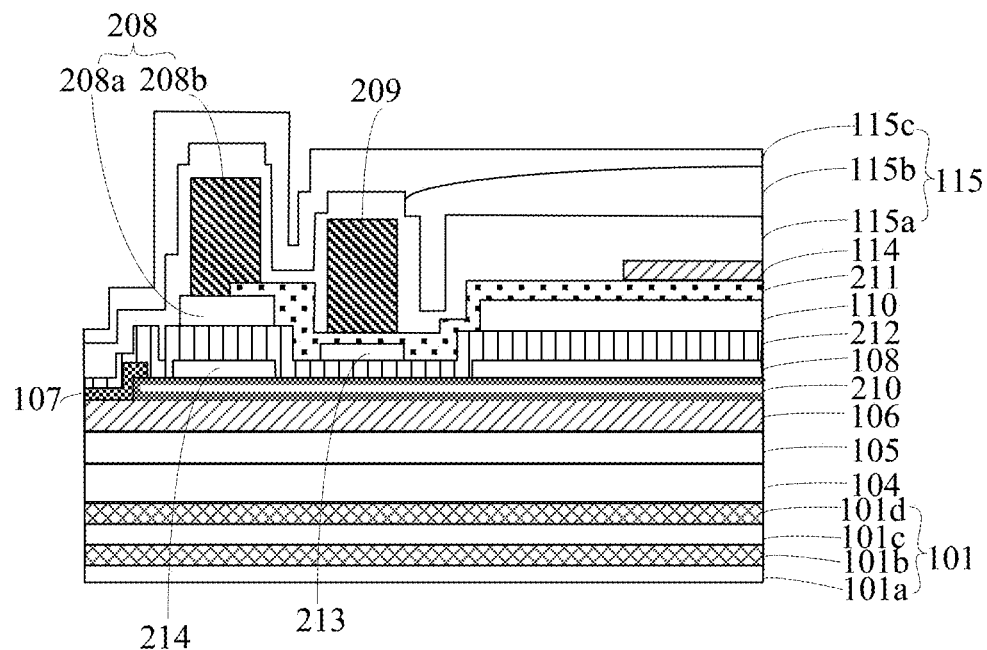
FIG. 11 illustrates a cross-sectional schematic diagram along the R-R line as shown in FIG. 7.

As shown in FIGS. 7 and 11, the display substrate 1a further includes a first encapsulation retaining wall 208 and a second encapsulation retaining wall 209 located in the peripheral area 20 and surrounding the display area 10, the first encapsulation retaining wall 208 is located on the side of the anti-crack retaining wall 206 close to the display area 10, the second encapsulation retaining wall 209 is located on the side of the first encapsulation retaining wall 208 close to the display area 10, and the height of the first encapsulation retaining wall 208 is greater than the height of the second encapsulation retaining wall 209. The first encapsulation retaining wall 208 may be disposed on the same layer as at least one of the second planarization layer 110 and the pixel defining layer 112 and are disconnected from each other, for example, the first encapsulation retaining wall 208 includes a third layer 208a disposed on the same layer as the second planarization layer 110 and disconnected from each other, and a fourth layer 208b disposed on the same layer as the pixel defining layer 112 and disconnected from each other, but are not limited thereto. The second encapsulation retaining wall 209 is disposed on the same layer as at least one of the second planarization layer 110 and the pixel defining layer 112 and is disconnected from each other, for example, the second encapsulation retaining wall 209 and the pixel defining layer 112 are disposed on the same layer and disconnected from each other.

As shown in FIGS. 9 and 11, the display substrate 1a may include an encapsulation layer 115. The encapsulation layer 115 may be formed on the display area 10 and a part of the peripheral area 20, and the encapsulation layer 115 includes a first inorganic encapsulation layer 115a, an organic encapsulation layer 115b, and a second inorganic encapsulation layer 115c that are sequentially stacked. The first inorganic encapsulation layer 115a and the second inorganic encapsulation layer 115c are disposed in the display area 10 and a part of the peripheral area 20, and wrap the first encapsulation retaining wall 208 and the second encapsulation retaining wall 209. The organic encapsulation layer 115b is disposed between the first inorganic encapsulation layer 115a and the second inorganic encapsulation layer 115c and located on the side of the second encapsulation retaining wall 209 close to the display area 10.

The first inorganic encapsulation layer 115a and the second inorganic encapsulation layer 115c may be formed by using a chemical vapor deposition process, but are not limited thereto, and a physical vapor deposition process, or the like may also be used; while the organic encapsulation layer 115b may be formed by an inkjet printing process, but is not limited thereto, and may also be formed by a spraying process, or the like. In the process of manufacturing the organic encapsulating layer 115b, since the organic encapsulating material has a certain fluidity, the flow of the organic encapsulating material can be limited by the first encapsulation retaining wall 208 and the second encapsulation retaining wall 209, so as to avoid the problem of encapsulating failure.

It should be noted that the first inorganic encapsulation layer 115a and the second inorganic encapsulation layer 115c may also cover the anti-crack block 207 and the anti-crack retaining wall 206, but are not limited thereto, depending on the specific circumstances.

As shown in FIG. 11, the part of the peripheral area 20 close to the display area 10 may further include some circuit structures, such as, a peripheral trace 210, a first peripheral transfer wire 211, and a second peripheral transfer wire 212. The peripheral trace 210 may be disposed on the same layer as the source electrode 102c and the drain electrode 102d. The first peripheral transfer wire 211 may be disposed on the same layer as the anode 111. The second peripheral transfer wire 212 may be disposed on the same layer as the transfer electrode 109 of the display area 10a. The peripheral trace 210 may be located below the first encapsulation retaining wall 208 and the second encapsulation retaining wall 209. The first peripheral transfer wire 211 may be located between the third layer 208a and the fourth layer 208b in the second encapsulation retaining wall 209. The second peripheral transfer wire 212 may be located below the first encapsulation retaining wall 208 and the second encapsulation retaining wall 209.

In addition, as shown in FIG. 11, a first pattern block 213 may be disposed below the second encapsulation retaining wall 209 to elevate the second encapsulation retaining wall 209. The first pattern block 213 may be disposed on the same layer as the second planarization layer 110. A second pattern block 214 may be disposed below the first encapsulation retaining wall 208 to elevate the first encapsulation retaining wall 208. The second pattern block 214 may be disposed on the same layer as the first planarization layer 108.

It should be noted that the design of the circuit structures in the peripheral area 20 is not limited thereto, depending on the specific circumstances.

As shown in FIG. 9, the flexible display device 1 further includes a touch substrate 1e at least located in the display area 10. The touch substrate 1e is located on the side of the polarizer 1b close to the display substrate 1a and located on the side of the encapsulation layer 115 away from the flexible base 101. Specifically, the touch substrate 1e may include a touch electrode layer 116 located on the light emitting structure layer away from the driving circuit layer and an organic protection layer 117 located on the touch electrode layer 116 away from the display substrate 1a. The touch electrode layer 116 may include a receiving electrode and a transmitting electrode insulated from each other. The material of the organic protection layer 117 may include PI, acryl, or polyethylene terephthalate, etc.

It should be noted that a part of the touch substrate 1e may also be located in a part of the peripheral area 20, depending on the specific circumstances. In addition, the position of the touch substrate 1e is not limited thereto, and it may also be disposed on the side of the polarizer 1b away from the flexible base 101, depending on the specific circumstances.

Figure 10:
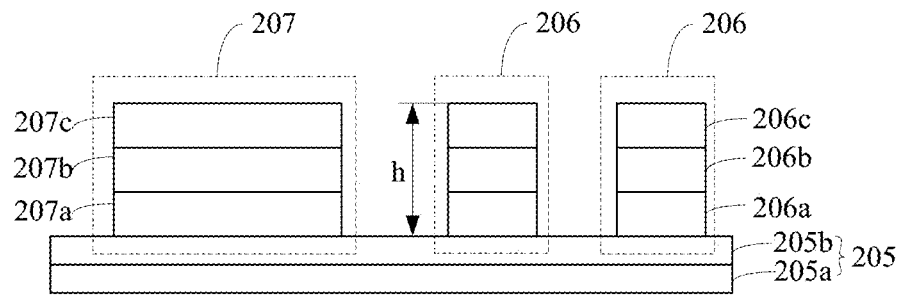
FIG. 10 illustrates a cross-sectional schematic diagram along the Q-Q line as shown in FIG. 7.

In some embodiments of the present disclosure, the anti-crack retaining wall 206 may be disposed on the same layer as at least one of the first planarization layer 108, the second planarization layer 110, the pixel defining layer 112, and the organic protection layer 117 and disconnected from each other. As shown in FIG. 10, the anti-crack retaining wall 206 may include a fifth layer 206a disposed on the same layer as the first planarization layer 108 and disconnected from each other, a sixth layer 206b disposed on the same layer as the second planarization layer 110 and disconnected from each other, and a seventh layer 206c disposed on the same layer as the organic protection layer 117 and disconnected from each other, but it should be understood that the structure of the anti-crack retaining wall 206 is not limited thereto, depending on the specific circumstances.

Similarly, the anti-crack block 207 may be disposed on the same layer as at least one of the first planarization layer 108, the second planarization layer 110, the pixel defining layer 112, and the organic protection layer 117 and disconnected from each other. As shown in FIG. 10, the anti-crack retaining wall 206 may include an eighth layer 207a disposed on the same layer as the first planarization layer 108 and disconnected from each other, a ninth layer 207b disposed on the same layer as the second planarization layer 110 and disconnected from each other, and a tenth layer 207c disposed on the same layer as the organic protection layer 117 and disconnected from each other, but it should be understood that the structure of the anti-crack block 207 is not limited thereto, depending on the specific circumstances.

Optionally, the layer number of the organic film layers in the anti-crack retaining wall 206 and the layer number of the organic film layers in the anti-crack block 207 are the same and correspond to each other one by one, where the film layers with the same sequence of layers in the anti-crack retaining wall 206 and the anti-crack block 207 are arranged on the same layer and are disconnected from each other. Since the film layers of the anti-crack block 207 are consistent with the film layers of the anti-crack retaining wall 206, the stacking design of the film layers consistent with the anti-crack retaining wall 206 can be adopted in the design of the mask plate, and the process is synchronously performed during film coating without new processes, maintaining Takt Time in product production and not increasing the mould and production cost.

Optionally, the surface of the anti-crack block 207 away from the anti-crack base 205 may be flush with the surface of the anti-crack retaining wall 206 away from the anti-crack base 205.

As shown in FIG. 10, the thickness h of the anti-crack retaining wall 206 may range from about 4 µm to 5 µm, such as, 4 µm, 4.5 µm, 5 µm and the like, which can increase the blocking effect on cracks and reflect the advantage of the anti-crack retaining wall 206.

It should be understood that the display area of some embodiments of the present disclosure may also be designed with an opening, and the opening (not shown) may be used to mount a camera, a sensor, a HOME key, an earpiece or a speaker, etc.

In addition, it should also be understood that the above disclosed embodiments and features in the embodiments may be combined with each other without conflict.

The present disclosure further provides an electronic device, which includes the flexible display device 1 as described in any of the above embodiments.

According to some embodiments of the present disclosure, the specific type of the electronic device is not particularly limited, and any type of electronic device commonly used in the art may be used, such as OLED displays, mobile phones, tablet computers, notebook computers and other mobile devices, watches, wristbands and other wearable devices, and those skilled in the art may select accordingly according to the specific application, which will not be repeated herein.

It should be noted that the electronic device includes other necessary parts and components in addition to the flexible display device 1, taking a display as an example, specifically, such as a housing, a power line, a driving chip and the like, and those skilled in the art may perform corresponding supplementation according to the specific use requirements of the display apparatus, which will not be repeated herein.

After considering the specification and practicing the invention disclosed herein, other embodiments of the present disclosure will be apparent to those skilled in the art. The present application is intended to cover any variations, uses, or adaptations of the present disclosure, which follow the general principles of the present disclosure and include common general knowledge or conventional technical means in the art that are not disclosed in the present disclosure. The specification and embodiments are only considered as exemplary, and the true scope and spirit of the present disclosure are indicated by the appended claims.

What is claimed is:

1. A flexible display device, comprising a display substrate, a polarizer and a first optical adhesive layer stacked in sequence, provided with a display area and a peripheral area around the display area, the peripheral area comprising a first lateral area extending in a first direction, a second lateral area extending in a second direction, and an arc-shaped corner area between the first lateral area and the second lateral area, the first direction interacting with the second direction;

wherein the arc-shaped corner area has a first side, an inner arc side, a second side and an outer arc side connected end to end sequentially, the first side is connected with the first lateral area, and the second side is connected with the second lateral area;

the arc-shaped corner area comprises a first corner area having the first side and a second corner area having the second side, a center of the arc-shaped corner area being in the first corner area;

the arc-shaped corner area is bendable, and a bending angle of the first corner area is larger than a bending angle of the second corner area; and in the first corner area, an outer contour of an orthographic projection of the polarizer and/or the first optical adhesive layer on a reference plane is outside of an outer contour of an orthographic projection of the display substrate on the reference plane, the reference plane being parallel to the first direction and the second direction; and wherein the display substrate comprises an anti-crack base, an anti-crack retaining wall and a plurality of anti-crack blocks that are at least in the first corner area, the anti-crack retaining wall is on the anti-crack base and outside of the display area, and the plurality of anti-crack blocks are on the anti-crack base and on one side of the anti-crack retaining wall away from the display area.

2. The flexible display device according to claim 1, wherein the anti-crack base, the anti-crack retaining wall and the plurality of anti-crack blocks are further in the second corner area;

the plurality of anti-crack blocks are divided into at least two rows of anti-crack block groups, and each row of anti-crack block groups comprises at least two anti-crack blocks arranged according to an outer contour of an orthographic projection on the reference plane of a portion of the display substrate in the arc-shaped corner area;

middle regions of two adjacent anti-crack blocks in each row of anti-crack block groups are contacted and one side of the middle regions is provided with a gap; and among two adjacent rows of the anti-crack block groups, an anti-crack block in one row of anti-crack block groups corresponds to the gap between two adjacent anti-crack blocks in the other row of anti-crack block groups.

3. The flexible display device according to claim 2, wherein an orthographic projection of an anti-crack block of the plurality of anti-crack blocks on the reference plane comprises a first point and a second point that are farthest apart; and among the two adjacent rows of anti-crack block groups, the first point and the second point of the anti-crack block in one row of anti-crack block groups and a contact point between the two adjacent anti-crack blocks in the other row of anti-crack block groups are on a same straight line.

4. The flexible display device according to claim 3, wherein the orthographic projection of the anti-crack block on the reference plane is a quadrangle, the quadrangle has a first diagonal and a second diagonal, two end points of the first diagonal are the first point and the second point respectively, and a length of the first diagonal is greater than a length of the second diagonal;

the outer contour of the orthographic projection on the reference plane of the portion of the display substrate in the arc-shaped corner area is an arc line; and an included angle between the first diagonal and a normal to a tangent point corresponding to the first diagonal on the arc line is an acute angle.

5. The flexible display device according to claim 4, wherein the quadrangle is symmetric with respect to the first diagonal.

6. The flexible display device according to claim 5, wherein an orthographic projection of an anti-crack block, of the at least two rows of anti-crack block groups, closest to the outer arc side, on the reference plane is a rhombus.

7. The flexible display device according to claim 2, wherein the anti-crack base, the plurality of anti-crack blocks, and the anti-crack retaining wall each is composed of at least one organic film layer.

8. The flexible display device according to claim 7, wherein in the display area, the display substrate comprises a flexible base, the flexible base comprising a first organic base layer, an inorganic barrier layer, a second organic base layer, and an inorganic buffer layer stacked in sequence; and the anti-crack base is integrally formed with at least one of the first organic base layer and the second organic base layer.

9. The flexible display device according to claim 8, wherein the display substrate further comprises a driving circuit layer and a light emitting structure layer in the display area, the driving circuit layer is on the inorganic buffer layer and comprises a thin film transistor, and the light emitting structure layer is on a side of the driving circuit layer away from the inorganic buffer layer and comprises a first planarization layer covering the thin film transistor, a transfer electrode on the first planarization layer, a second planarization layer covering the transfer electrode, and an anode and a pixel defining layer disposed on the second planarization layer sequentially, wherein the anode is electrically connected with the transfer electrode through a via hole, the transfer electrode is connected with the thin film transistor through a via hole, the pixel defining layer is provided with a pixel opening for exposing the anode, and a material of each of the first planarization layer, the second planarization layer and the pixel defining layer is an organic material; and wherein the flexible display device further comprises a touch substrate at least in the display area and on a side of the polarizer close to the display substrate, the touch substrate comprising a touch electrode layer on a side of the light emitting structure layer away from the driving circuit layer and an organic protection layer on a side of the touch electrode layer away from the display substrate;

the anti-crack retaining wall and at least one of the first planarization layer, the second planarization layer, the pixel defining layer and the organic protection layer are disposed on a same layer and are disconnected from each other; and an anti-crack block of the plurality of anti-crack blocks and at least one of the first planarization layer, the second planarization layer, the pixel defining layer and the organic protection layer are disposed on a same layer and are disconnected from each other.

10. The flexible display device according to claim 9, wherein
the at least one organic film layer in the anti-crack retaining wall and the at least one organic film layer in the anti-crack block have a same number of layers, and correspond one-to-one.

11. The flexible display device according to claim 10, wherein
a surface of the anti-crack block away from the anti-crack base is flush with a surface of the anti-crack retaining wall away from the anti-crack base.

12. The flexible display device according to claim 9, wherein the display substrate further comprises a first encapsulation retaining wall and a second encapsulation retaining wall that are in the peripheral area and around the display area, the first encapsulation retaining wall is on a side of the anti-crack retaining wall close to the display area, the second encapsulation retaining wall is on a side of the first encapsulation retaining wall close to the display area, and a height of the first encapsulation retaining wall is greater than a height of the second encapsulation retaining wall;
the first encapsulation retaining wall and at least one of the second planarization layer and the pixel defining layer are disposed on a same layer and are disconnected from each other; and
the second encapsulation retaining wall and at least one of the second planarization layer and the pixel defining layer are disposed on a same layer and are disconnected from each other.

13. The flexible display device according to claim 2, wherein
the at least two rows of anti-crack block groups are in the first corner area; and a portion of the at least two rows of anti-crack block groups away from the display area extends to the second corner area.

14. The flexible display devices according to claim 2, wherein
a plurality of circles of anti-crack retaining walls are provided, with a gap between two adjacent circles of anti-crack retaining walls;
the plurality of circles of anti-crack retaining walls are in the first corner area, and a portion of the plurality of circles of anti-crack retaining walls away from the display area extends to the second corner area, the first lateral area and the second lateral area.

15. The flexible display device according to claim 1, wherein
in the first corner area, the outer contour of the orthographic projection of the polarizer on the reference plane and the outer contour of the orthographic projection of the first optical adhesive layer on the reference plane are outside of the outer contour of the orthographic projection of the display substrate on the reference plane, and
the outer contour of the orthographic projection of the polarizer on the reference plane overlaps with the outer contour of the orthographic projection of the first optical adhesive layer on the reference plane.

16. The flexible display device according to claim 15, wherein the first corner area comprises a first sub-area and a second sub-area on a side of the first sub-area close to the first lateral area, the center of the arc-shaped corner area being in the first sub-area;
in the first sub-area, there is a first distance between the outer contour of the orthographic projection of the polarizer on the reference plane and the outer contour of the orthographic projection of the display substrate on the reference plane; and
in the second sub-area, there is a second distance between the outer contour of the orthographic projection of the polarizer on the reference plane and the outer contour of the orthographic projection of the display substrate on the reference plane, the second distance being greater than the first distance.

17. The flexible display device according to claim 16, wherein the first corner area further comprises a third sub-area and a fourth sub-area, the third sub-area being on a side of the first sub-area close to the second corner area, the fourth sub-area being on a side of the second sub-area close to the first lateral area;
in the third sub-area, there is a third distance between the outer contour of the orthographic projection of the polarizer on the reference plane and the outer contour of the orthographic projection of the display substrate on the reference plane; and
in the fourth sub-area, there is a fourth distance between the outer contour of the orthographic projection of the polarizer on the reference plane and the outer contour of the orthographic projection of the display substrate on the reference plane, the third distance being smaller than the first distance, the fourth distance being smaller than the second distance.

18. The flexible display device according to claim 15, wherein
in the second corner area, the outer contour of the orthographic projection of the polarizer on the reference plane and the outer contour of the orthographic projection of the first optical adhesive layer on the reference plane overlap with the outer contour of the orthographic projection of the display substrate on the reference plane.

19. The flexible display device according to claim 1, further comprising a cover plate on a side of the first optical adhesive layer away from the polarizer;
wherein the outer contour of the orthographic projection of the polarizer on the reference plane and the outer contour of the orthographic projection of the first optical adhesive layer on the reference plane are within or overlap with an outer contour of an orthographic projection of the cover plate on the reference plane.

20. An electronic device, comprising a flexible display device, wherein
the flexible display device comprises a display substrate a polarizer and a first optical adhesive layer stacked in sequence, and is provided with a display area and a peripheral area around the display area, the peripheral area comprising a first lateral area extending in a first direction, a second lateral area extending in a second direction, and an arc-shaped corner area between the first lateral area and the second lateral area, the first direction interacting with the second direction;
wherein the arc-shaped corner area has a first side, an inner arc side, a second side and an outer arc side connected end to end sequentially, the first side is connected with the first lateral area, and the second side is connected with the second lateral area;
the arc-shaped corner area comprises a first corner area having the first side and a second corner area having the second side, a center of the arc-shaped corner area being in the first corner area;
the arc-shaped corner area is bendable, and a bending angle of the first corner area is larger than a bending angle of the second corner area; and
in the first corner area, an outer contour of an orthographic projection of the polarizer and/or the first optical adhesive layer on a reference plane is outside of an outer contour of an orthographic projection of the display substrate on the reference plane, the reference plane being parallel to the first direction and the second direction; and
wherein the display substrate comprises an anti-crack base, an anti-crack retaining wall and a plurality of anti-crack blocks that are at least in the first corner area, the anti-crack retaining wall is on the anti-crack base and outside of the display area, and the plurality of anti-crack blocks are on the anti-crack base and on one side of the anti-crack retaining wall away from the display area.

* * * * *